UNITED STATES PATENT OFFICE.

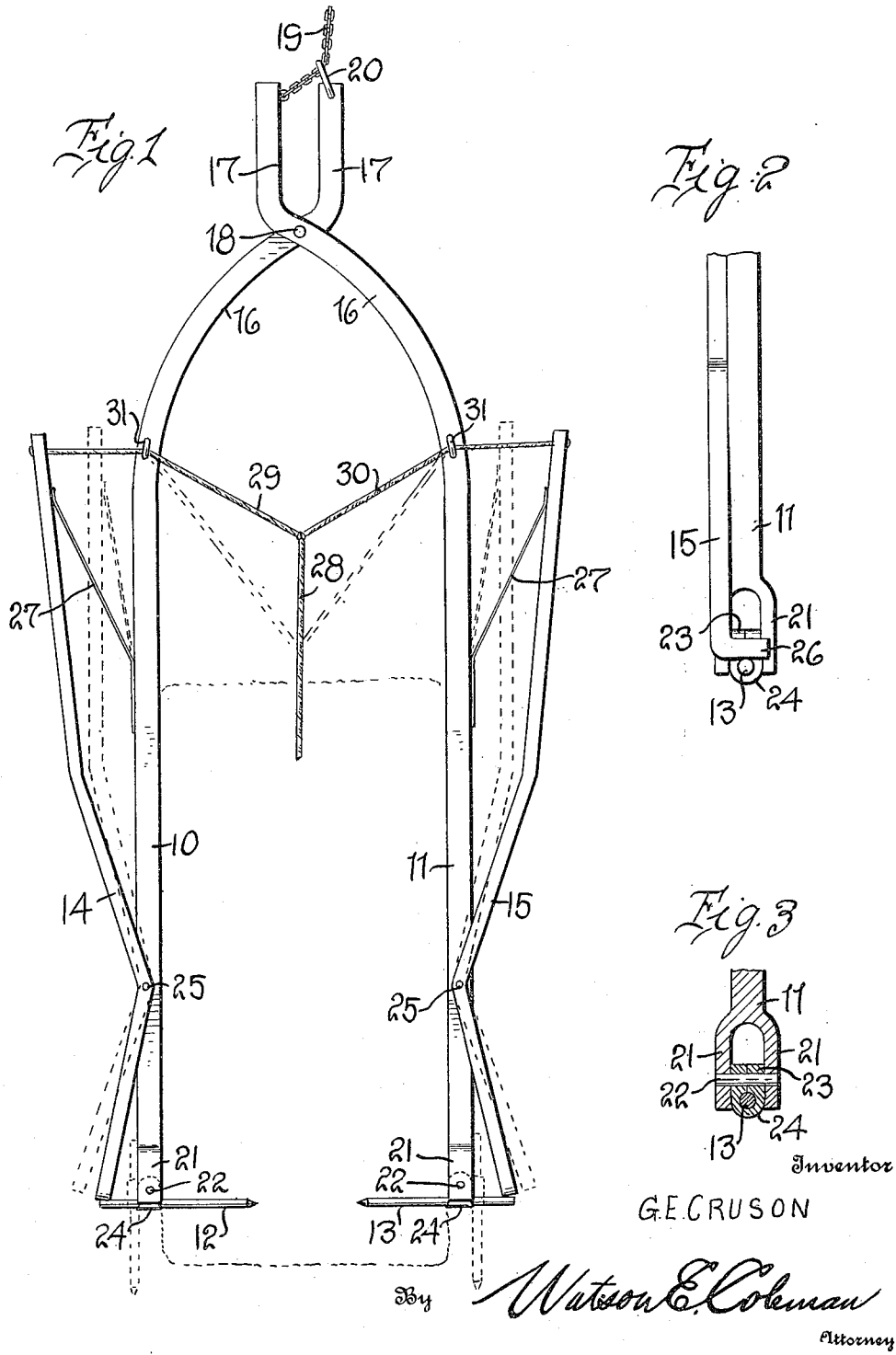

GEORGE E. CRUSON, OF YOUNTVILLE, CALIFORNIA.

DERRICK-FORK.

1,153,764.      Specification of Letters Patent.      Patented Sept. 14, 1915.

Application filed June 7, 1915. Serial No. 32,645.

*To all whom it may concern:*

Be it known that I, GEORGE E. CRUSON, a citizen of the United States, residing at Yountville, in the county of Napa and State of California, have invented certain new and useful Improvements in Derrick-Forks, of which the following is a specification, reference being had to the accompanying drawings.

My present invention relates to new and useful improvements in derrick forks and has more particular reference to devices of this character which are especially adapted for use in elevating bales of hay or similar bundles.

One of the principal objects of the invention is to provide a fork of the character described which is relatively simple in construction and may, therefore, be cheaply manufactured and is so designed that the bale engaging spikes at the lower ends of the pivoted fork arms may be securely held in fixed position when a bale of hay is being transported and may be easily and quickly released, when the fork is to be disengaged from the bale of hay.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a view in elevation, showing the fork applied to a bale of hay, the released position of the bale engaging spikes and latch bars being indicated in dotted lines; Fig. 2 is a detail view illustrating the manner in which the stub arms are adapted to engage with the pivoted bale engaging spikes; and Fig. 3 is a detail view in vertical section showing the manner in which the spikes are attached to the lower ends of the fork arms.

In taking up the detailed description of the invention, reference will first be had to Fig. 1, wherein the preferred embodiment of the fork is best illustrated as an operative entirety. As shown in this figure the fork consists generally in a pair of pivotally united arms 10 and 11; a pair of bale engaging spikes 12 and 13, which are pivotally attached to the lower ends of the fork arms, and a pair of latch bars 14 and 15, which are pivotally secured to the fork arms and control both the bale engaging spikes. The fork arms 10 and 11 are similar in construction, each being curved at its upper end as at 16 and being provided with a straight terminal portion 17. The arms are pivotally connected to each other by an axle or pin 18 at the junction of their curved portions 16 and terminal portions 17. The straight terminal portions 17 are connected by means of a chain 19 which is secured to one of the members 17 and a ring 20 which is secured to the other member 17. The use of the chain and ring will be hereinafter more fully explained in that portion of the specification which is devoted to the description and operation of the fork. The lower end of each of the fork arms is bifurcated to produce a pair of spaced apertured ears 21. Between these ears 21 are pivoted on pins 22 the apertured ears 23 of a pair of tubes 24. These tubes 24 receive the bale engaging spikes previously designated by the numerals 12 and 13. These members 12 and 13 are sharpened or pointed at their inner ends so that they may readily pierce the bale of hay. The spikes are so arranged within the tubes that their inner end portions are considerably longer than their outer end portions. The latch bars previously designated at 14 and 15 are similar in design, each being formed from a rod of metal which is pivoted adjacent its lower terminal to the fork arms adjacent the lower terminals of these members on pivot pins 25. The lower ends of the bars are provided with right-angularly extending stubs 26, which members are adapted to engage with the outer ends of the spikes for holding these members against swinging movement when a bale of hay is being transported. The latch bars are longitudinally offset at their upper end portions so that these upper end portions will be disposed to engage at all times with the leaf springs 27, which members are riveted or otherwise suitably secured to the outer faces of the fork arms. As is best shown in Fig. 1, these springs are adapted to normally hold the upper ends of the latch bars away from the fork arms so that the stubs 26 will be normally held in proximity to the lower terminals of the fork arms and will, therefore, lie in the path of the spike so that the outer ends of these members are held against upward swinging movement beyond a horizontal plane. In controlling the latch bars, so that these members may be released, when desired to permit the spikes to swing, so that the fork may be disengaged from the bale of hay, I employ a releasing cable 28 which is connected by a pair of leads 29 and 30 to the upper ends of the latch bars 14 and 15. These leads are passed through guide eyelets 31 carried by the fork arms, as shown best in Fig. 1.

The actual construction and arrangement of the several parts of the invention, being thus disclosed, reference will now be had particularly to Fig. 1, wherein the manner in which the fork is operated, when being applied to or released from a bale of hay, is best illustrated. When the fork is to be applied to a bale of hay for lifting the same, the arms are first spread and passed so that they may be easily disposed on opposite sides of the bale. The lower terminals of the arms are then simultaneously moved toward the bale to engage the spikes therein. Each spike, when inserted, should lie at right angles to that face of the bale in which it is inserted. As previously explained, the stubs of the latch bars are normally held in the path of the outer ends of the spikes. Obviously, therefore, the fork may be lifted after the engagement of the spikes in a bale of hay, without any danger of disengagement of the spikes, for the hoisting cable is connected, as shown in Fig. 1, to the chain 19, which member since it passes through the ring, obviously tends to cause the lower ends of the fork arms to swing toward each other. When the fork is to be released from the bale of hay, it is only necessary to pull upon the cable 28, whereupon the lead cables 29 and 30 will swing the upper ends of the latch bars inwardly against the tension of the springs, with a resultant disengagement of the stubs 26, from the outer ends of the spikes 12 and 13. As soon as the stubs are disengaged from the spikes the weight of the bale will be sufficient to swing the spikes in the manner shown in dotted lines in Fig. 1, so that the bale may drop from the fork or in case the bale is placed before the latch bars are released, the fork may be lifted to pull the spikes out of the bale.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A device of the character described including a pair of pivotally united arms, a chain connected to the upper end of one arm, a ring carried by the adjacent end of the other arm, said chain being passed through the ring, article engaging members carried by the lower terminals of the arms, and spring pressed latching means for holding the article engaging members in operative position, said latching means being releasable for releasing the article engaging members.

2. A device of the character described including a pair of pivotally united arms, means connecting the upper terminals of the arms, an article engaging spike pivotally attached to the lower terminal of each arm, latch bars pivoted to the arms adjacent the lower terminals thereof, said latch bars being adapted to engage the outer terminals of the spikes for holding the inner terminals in operative position and against swinging movement, yieldable means carried by the arms and engageable with the latch bars for normally holding the lower terminals thereof in engagement with the spike members, and a flexible member connected to the latch bars, whereby the bars may be swung against the tension of the yieldable means to release the spikes, whereby an article held by the spikes between the lower terminals of the arms, may be released.

3. A device of the character described including a pair of pivotally united fork arms, a spike member pivotally attached to the lower terminal of each of the arms, a pivoted latch bar mounted upon each arm, a right-angularly extending stub formed on the lower terminal of each latch bar, said stubs being adapted to engage with the outer terminals of the spikes for holding the spikes in operative engagement with an article to be held, leaf springs secured to the fork arms and bearing against the upper terminals of the latch bars for normally holding the stubs in engagement with the spikes, guide eyes carried by the fork arms, cables passing through the eyes and connected at their outer ends to the latch bars, and a cable connected to the inner ends of said cables, said last mentioned cable being operable for swinging the latch bars against the tension of the springs to withdraw the stubs from engagement with an article held between the fork arms.

In testimony whereof I hereunto affix my signature in the presence of two witnesses.

GEORGE E. CRUSON.

Witnesses:
R. V. LEE,
S. P. KENTEWELL.

Copies of this patent may be obtained for five cents each, by addressing the "Commissioner of Patents, Washington, D. C."